Figure 3:
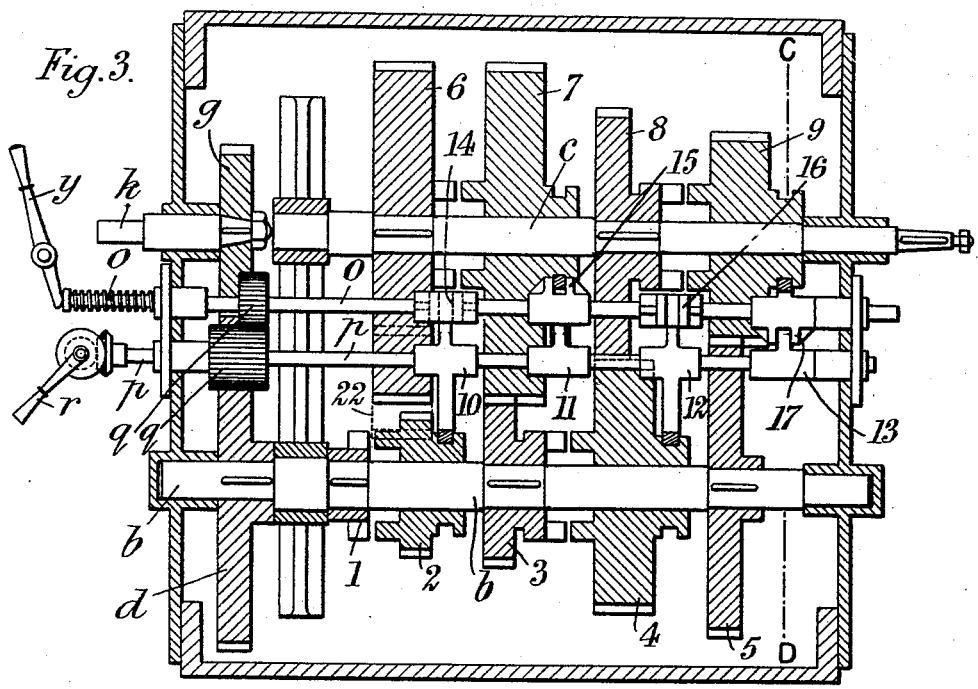

No. 773,999. PATENTED NOV. 1, 1904.
A. SOAMES & W. LANGDON-DAVIES.
CHANGE SPEED GEAR.
APPLICATION FILED JAN. 18, 1904.
NO MODEL. 3 SHEETS—SHEET 1.
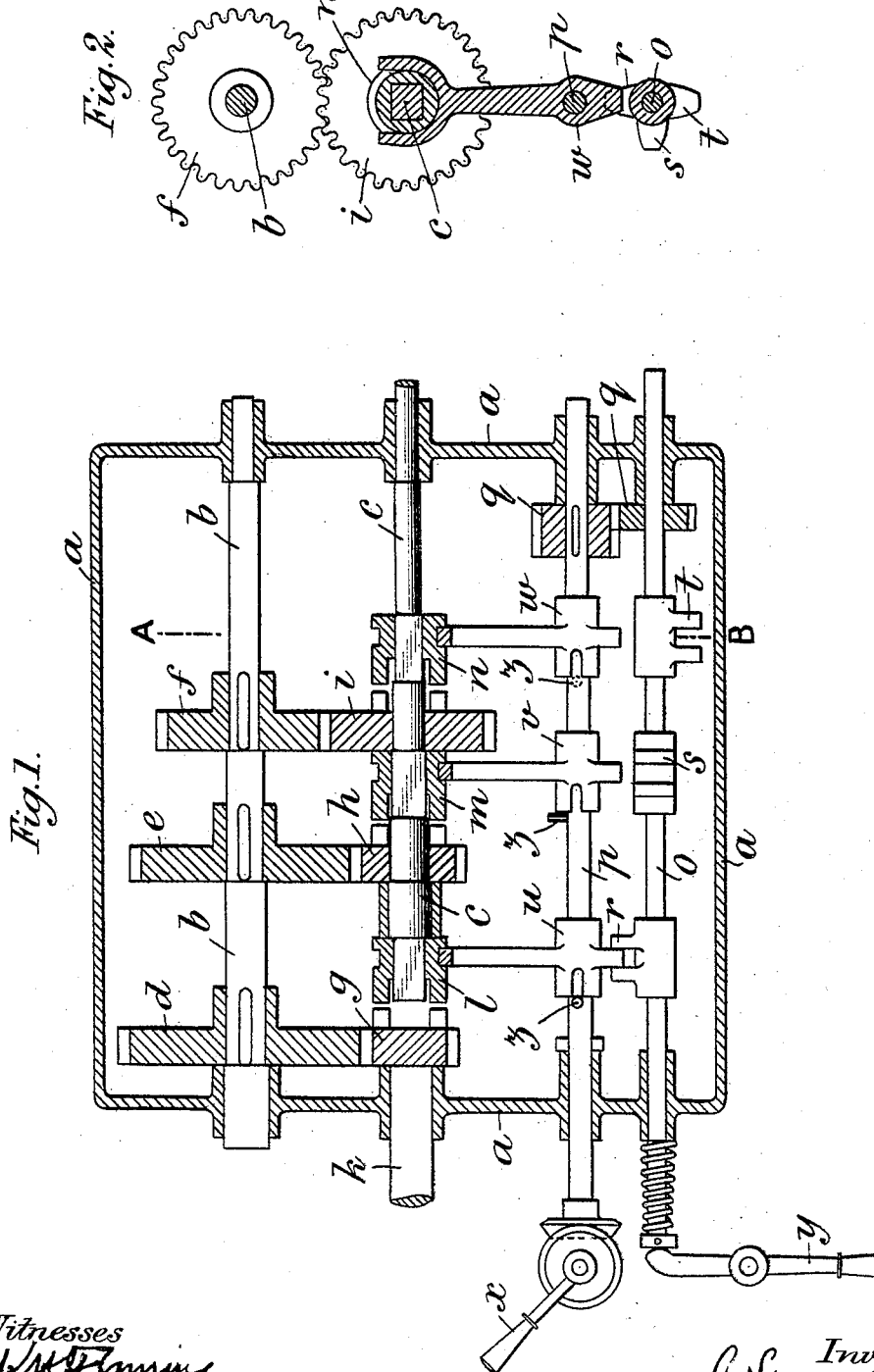

No. 773,999. PATENTED NOV. 1, 1904.
A. SOAMES & W. LANGDON-DAVIES.
CHANGE SPEED GEAR.
APPLICATION FILED JAN. 18, 1904.
NO MODEL. 3 SHEETS—SHEET 2.

Witnesses
Inventors
A. Soames
W. Langdon-Davies
By their attorneys
Baldwin Davidson Wight No. 773,999. PATENTED NOV. 1, 1904.
A. SOAMES & W. LANGDON-DAVIES.
CHANGE SPEED GEAR.
APPLICATION FILED JAN. 18, 1904.
NO MODEL. 3 SHEETS—SHEET 3.

Witnesses
Inventors

No. 773,999. Patented November 1, 1904.

UNITED STATES PATENT OFFICE.

ALFRED SOAMES AND WALTER LANGDON-DAVIES, OF COUNTY OF SURREY, ENGLAND.

CHANGE-SPEED GEAR.

SPECIFICATION forming part of Letters Patent No. 773,999, dated November 1, 1904.

Application filed January 18, 1904. Serial No. 189,617. (No model.)

*To all whom it may concern:*

Be it known that we, ALFRED SOAMES and WALTER LANGDON-DAVIES, engineers, subjects of the King of Great Britain, residing at 101 Southwork street, in the county of Surrey, England, have invented certain new and useful Improvements in Change-Speed Gear, of which the following is a specification.

Our improvements relate to change-speed gear in which two shafts are used, one of which can be driven from the other at varying speeds by any one or other of a number of gear-wheels of different diameters on one being used to drive a wheel on the other according to the speed required. For controlling which speed of driving shall be in action we employ a rod which can be turned as well as moved endwise. The rod may have fingers standing out from it in different radial directions in such way that if the rod be turned into one or other position one or other finger is then in position for causing one or other pair of wheels to be brought into action when the rod is subsequently moved endwise. The way in which the endwise movement given to the rod may be caused to bring into gear whichever pair of gear-wheels have been selected may be greatly varied, as also the way in which the bringing into action of any selected pair of wheels may be greatly varied. It may, for example, be effected either by sliding clutches or by shifting sidewise one of the wheels of the pair to bring it into gear with the other wheel, or it may be effected by bringing into action any one or other of a number of intermediate wheels.

Preferably we employ in addition to the above-mentioned rod another parallel rod geared with it. All the radial fingers may be on one of the rods or some may be on one and some on the other, if both rods have an endwise movement. The fingers may act upon slides sliding freely along the other, and arms projecting from the slides may transmit this sliding movement to the wheels or clutches.

By the above construction of change-speed gear a change can be made from any one speed to another without any of the intermediate speeds coming into operation. We also provide for preventing any turning movement being given, except at a time when the two shafts are not geared together by any gear-wheels. In some cases also we arrange the change-speed mechanism in such way that one movement of a pedal or lever first disengages the motor from the speed-gear, a further movement in the same direction sets free all the gear-wheels of this gear to allow of a fresh selection of driving speed being made, and, vice versa, on the return movement of the pedal the wheels of the speed-gear selected for driving at the speed required first become engaged to their shafts or to one another, and then the gear is coupled to the motor.

Figure 4:
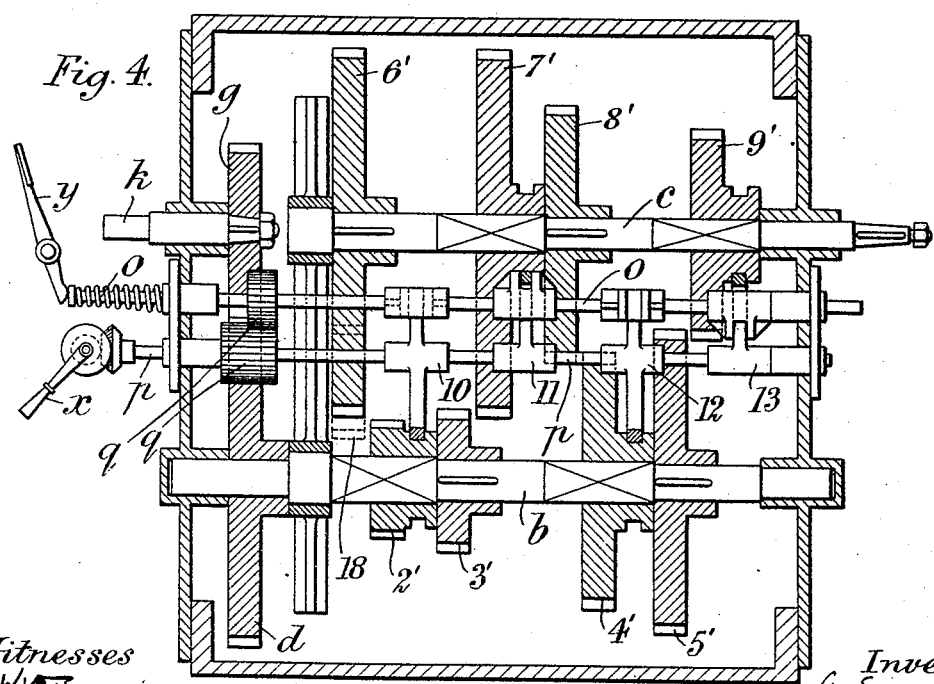
Figure 5:
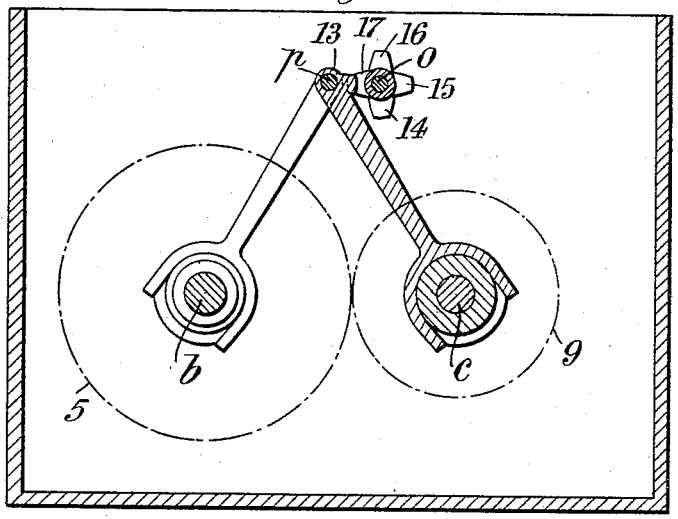
Figure 6:
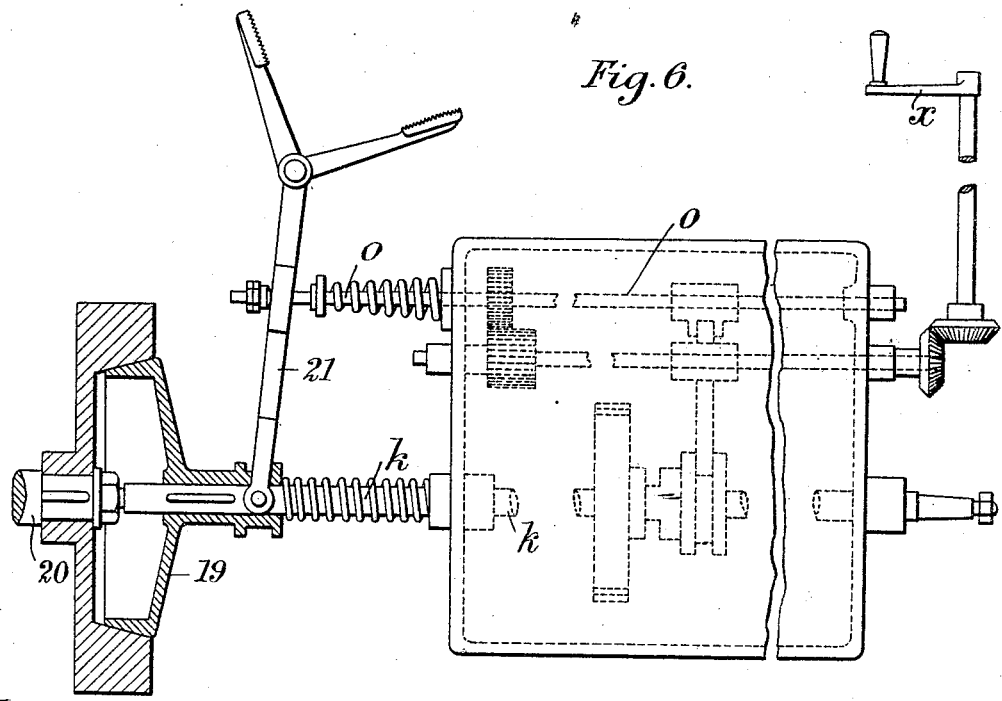

Figure 1 shows, partly in section, an example of the change-speed gear in a simple form; Fig. 2, a section on the line A B, Fig. 1. Figs. 3 and 4 show modifications of the arrangement shown in Fig. 1. Fig. 5 is a section on the line C D, Fig. 3. Fig. 6 shows change-speed gear, such as shown in Figs. 1, 2, and 3, arranged to be put out of action by a pedal, the first movement of which disconnects the motor and the further movement sets the parts of the gear in position to allow of a fresh selection being made.

In Figs. 1 and 2 $a$ is a casing. $b$ and $c$ are two parallel shafts. The shaft $b$ has fast upon it three toothed wheels $d\ e\ f$ of varying diameters. The other shaft $c$ has loose upon it other wheels $h\ i$, which are always in gear with the wheels $e\ f$ on the shaft $b$. $k$ is a shaft in line with the shaft $c$ and driven from the engine. On it is fixed a toothed wheel $g$, gearing with the wheel $d$, which is fast with the shaft $b$. The shaft $b$ is thus constantly driven. $l\ m\ n$ are sliding clutch-pieces on the shaft $c$. They turn with the shaft, but can be shifted endwise along it. The clutches may be of any suitable kind. In the drawings they are shown as being formed with projections on their end to interlock with corresponding projections at the sides of the wheels $g\ h\ i$, but coned or other form of friction or other clutches might be used. By sliding the clutch $l$ to the left the shaft $k$ becomes coupled to the shaft $c$ and directly drives it, or if the clutch $m$ is shifted to the left the wheel $h$ is made fast with the shaft $c$. This shaft is revolved at a slower speed by the wheels $e\ h$, or if the clutch $n$ is shifted to the left the wheel $i$ is made fast to the shaft $c$ and this shaft driven at a still slower speed. $o\ p$ are two parallel rods geared together by the wheels $q$, so that if one is turned the other turns with it. Fast on the rod $o$ are radial fingers $r\ s\ t$ in different radial planes. $u\ v\ w$ are sleeves loose upon the rod $p$. Each sleeve has an arm projecting from it which engages, as shown, with one or other of the clutch-pieces $l\ m\ n$. Each sleeve has also a short arm extending from it toward the rod $o$. A turning movement can be given to the rod $o$ by turning the hand-lever $x$ and an endwise movement by another lever $y$ and spring, as shown in the drawings in a diagrammatic manner. When the rod $o$ has been shifted endwise to the right, as shown in Fig. 1, a turning movement can be given to it by the hand-lever $x$ and either cause the fingers or cams $r$ to engage with the short arm on the sleeve $u$, as shown, or to cause the fingers or cams $s$ to engage with the arm on $v$ or $t$ with $w$, and when the rod is subsequently allowed to be shifted endwise to the left by the action of the spring whichever sleeve is engaged with one or other of the cam-fingers is also shifted to the left and the speed at which the shaft $c$ is driven is thereby controlled.

To prevent any turning movement being given to the rods $o\ p$ before the rod $o$ has been shifted endwise to the right far enough to insure that all the clutches are disengaged, we secure radial pins $z$ to the rod $p$. These pins normally restrain the sleeves $u\ v\ w$ from moving endwise along the rod; but whenever any one or other of the cam-fingers $r\ s\ t$ is by the turning of the rod $o$ brought into engagement with one or other of the sleeves $u\ v\ w$ the pin $z$, which previously restrained that sleeve from moving to the left, comes opposite to a longitudinal slot in the sleeve, and so allows this sleeve to be shifted, and so soon as the pin enters the slot no turning movement can be given to the rods. Thus the rod $o$ cannot be turned unless it has first been shifted endwise to disengage whichever clutch was previously in action, nor can it subsequently be shifted back in the opposite direction unless one or other of the pins $z$ is opposite to a slot in one or other of the sleeves $u\ v\ w$.

In the modification shown in Figs. 3 and 5 the cam-fingers are on one rod $o$ and the sliding sleeves on the rod $p$. The shaft $k$, driven from the engine, is at all times in gear with the shaft $b$ by the wheels $g\ d$. The shaft $b$ has fast upon it a clutch-collar 1. It also has upon it four toothed wheels, 2, 3, 4, and 5. The toothed wheels 2 and 4 are loose and 3 and 5 fast upon it. The wheel 2 is always geared with the broad wheel 6 through an intermediate wheel 22 and serves for backward driving. The wheels 3, 4, and 5 are always directly in gear with broad wheels 7, 8, and 9 on the shaft $c$. The wheels 6 and 8 are fast on the shaft and 7 and 9 loose upon it. The rods $o\ p$ are, as in the arrangement shown in Fig. 1, geared together by wheels $q\ q$ and can be turned by a lever $x$, while an endwise movement can be given to the rod $o$ by a lever $y$. The rod $p$ has upon it four sliding sleeves 10, 11, 12, and 13. Each has a fork-arm extending from it. By the arm extending from 10 wheel 2 can be shifted sidewise on its shaft $b$. The arm on 11 can similarly shift the wheel 7 on its shaft $c$. The arm on 12 shifts the wheel 4 and the arm on 13 the wheel 9. Each sleeve has also a short arm extending from it, as in the previous arrangement. Fast on the rod $o$ are four sets of fingers 14, 15, 16, and 17 in different radial position. If the rod $o$ is turned into position for the finger 14 to engage with the short arm on the sleeve 10 and is then allowed to be shifted endwise to the left, clutch-pieces on the side of the wheel 2 are made to engage with other clutch-pieces on the collar 1, and the wheel 2 is so made fast with the shaft $b$, and the shaft $c$ is driven backward at a slow speed, or if fingers 15 have been brought into position to engage with the short arm on sleeve 11 and this sleeve therefore shifted to the left the wheel 7 would be shifted with it and clutch-pieces on its side made to engage with other clutch-pieces on the side of the wheel 6, so that the wheel 7 is made fast with its shaft $c$, and this shaft is then driven forward at a slow speed, or if the fingers 16 have been brought into position to shift the wheel 4 sidewise clutch-pieces on its side engage with clutch-pieces at the side of the wheel 3 and the wheel 4 becomes locked to its shaft and drives $c$ at another different speed, or if the fingers 17 have been brought into position to shift the wheel 9 sidewise the wheel 9 becomes locked to its shaft and the shaft $c$ is driven at a still faster speed. As in the arrangement shown in Fig. 1, the sliding sleeves may by radial pins extending from the rod $p$ be restrained from moving endwise upon this rod except at the times when they are required to be moved. These pins and the corresponding slots in the sleeves are not shown in Fig. 3.

In the modification shown in Fig. 4 the wheels 2', 3', 4', and 5' are not always in gear with the wheels 6', 7', 8', and 9'. All the wheels 2', 3', 4', and 5' always revolve with the shaft $b$, and 2' and 4' can be slid along it. The wheel 2' when slid to the left is not brought directly into gear with the wheel 6', but into gear with an intermediate wheel 18, so as to drive the shaft $c$ in a direction for driving backward. When the wheel 7' is shifted sidewise to bring the wheel 7' into gear with the wheel 3', the shaft $c$ will be driven in a forward direction at a slow speed, or if the wheel 4' is shifted sidewise to bring it into gear with the wheel 8' the shaft $c$ will be driven at a quicker speed, or if the wheel 9' is shifted sidewise to bring it into gear with the wheel 5' the shaft c will be driven at a still quicker speed.

Fig. 6 shows the change-speed gear used in combination with a pedal, the first movement of which is made to disconnect the motor from the gear and then by a further movement in the same direction made to disengage the parts of the change-speed gear. In this figure 19 is a clutch by which the shaft k of the change-speed gear is normally clutched to a shaft 20 driven from the engine. 21 is a pedal-lever which when turned disengages this clutch and then by a further movement in the same direction comes against a collar on the rod o of the change-speed gear and by shifting this rod endwise disengages the parts of the driving-gear, as hereinbefore explained. The rod o can then be turned into any desired position, according to the driving speed required, by turning the hand-lever x. Then when the pedal is allowed to regain its original position the rod o is first set free to be shifted endwise to cause the parts of the speed-gear which are to come into gear to drive at the speed required to come into gear, and afterward the clutch 19 is allowed to lock the driving-shaft 20 to the shaft k.

What we claim is—

1. In change-speed gear the combination of two shafts, a series of gear-wheels of varying diameter on one, corresponding wheels on the other, a rod which can be turned as well as moved endwise, fingers extending from the sides of this rod in different radial planes, sliding pieces with which the fingers can be made to engage one at a time by turning the rod and means by which if the rod be then moved endwise the slide moving with it brings into action one or other of the pairs of wheels.

2. In change-speed gear the combination of two shafts, a series of gear-wheels of varying diameter on one, corresponding wheels on the other, two parallel rods both geared together and capable of being turned and one of being also moved endwise, fingers extending out in different radial planes from the endwise-movable rod, sliding pieces on the other with which the fingers can be made to engage one at a time by turning the rods, and means by which if the endwise-moving rod be moved endwise the slide engaged by one or other finger and moved with it brings into action one or other pair of wheels for driving one shaft from the other.

3. In change-speed gear the combination of two shafts, a series of gear-wheels of varying diameter on one, corresponding wheels on the other, two parallel rods both geared together and capable of being turned and one of being also moved endwise, fingers extending out in different radial planes from the endwise-movable rod, sliding sleeves on the other with which the fingers can be made to engage one at a time by turning the rods, means by which if the endwise-moving rod be moved endwise the sliding sleeve engaged by one or other finger and moved with it brings into action one or other pair of wheels for driving one shaft from the other, pins extending out from the rod which carries the sleeves normally bearing against one end of the sleeves and restraining them from moving endwise, said sleeves having slots and either the slots or the pins being in different radial planes and so disposed that if any sleeve is engaged by a finger and by it shifted endwise the pin which before prevented this sleeve from moving endwise then passes into the slot in the sleeve and allows the sleeve to move freely.

4. In change-speed gear, the combination of two shafts, a series of gear-wheels of varying diameter on one shaft, corresponding wheels on the other shaft gearing with the wheels on the first-mentioned shaft, one of each pair being loose on its shaft, sliding clutches by which the loose wheels can be locked to the shafts, two rods both parallel with the shafts, both geared together and capable of being turned and one of being moved also endwise, fingers extending out in different radial planes from the endwise-movable rod; sliding pieces with which the fingers can be made to engage one at a time by turning the rods and means by which if the endwise-moving rod be moved endwise the slide engaged by one or other finger and moved with it shifts one or other of the clutches and thereby brings into action one or other pair of wheels.

5. In change-speed gear the combination of two shafts, a series of gear-wheels of varying diameter on one shaft, corresponding wheels on the other shaft gearing with the wheels on the first-mentioned shaft, one of each pair being loose on its shaft; sliding clutches by which the loose wheels can be locked to the shafts, two rods both parallel with the shafts, both geared together and capable of being turned and one of also being moved endwise, fingers extending out in different radial planes from the endwise-movable rod, sliding sleeves on the other rod with which the fingers can be made to engage one at a time by turning the rods, means by which if the endwise-moving rod be moved endwise, the slide engaged by one or other finger and moved with it shifts one or other of the clutches and thereby brings into action one or other pair of wheels, pins extending out from the rod which carries the sliding sleeves normally bearing against one end of the sleeves and restraining them from moving endwise, said sleeves having slots, either the slots or the pins being in different radial planes and so disposed that if any sleeve is engaged by a finger and by it shifted endwise, the pin which before prevented this sleeve from moving endwise then passes into the slot in the sleeve and allows the sleeve to move freely.

6. In change-speed gear the combination of two shafts, a series of gear-wheels of varying diameter on one, corresponding wheels on the other, a rod which can be turned as well as moved endwise, means by which if the rod be turned into one or other position and then moved endwise one or other pair of wheels is brought into action while if the rod be moved endwise in the opposite direction all pairs of wheels are out of action, a clutch through which one of the shafts is driven from a motor, a lever, means by which the first movement of this lever disengages the clutch while a subsequent movement shifts the rod endwise to put out of action whichever pair of wheels was previously in action and means for preventing the rod from being turned until it has been moved back into this position.

ALFRED SOAMES.
    WALTER LANGDON-DAVIES.

Witnesses:
    ROBERT B. RANSFORD,
    JOHN HENDERSON WHITEHEAD.